United States Patent
Yamada et al.

(10) Patent No.: US 6,694,199 B1
(45) Date of Patent: Feb. 17, 2004

(54) AUTOMATIC PROGRAMMING APPARATUS AND STORAGE MEDIUM FOR STORING GRAPHIC DATA GENERATING PROGRAM

(75) Inventors: Satoshi Yamada, Kanagawa (JP); Masanobu Ishii, Kanagawa (JP); Yoshito Inoichi, Kanagawa (JP)

(73) Assignee: Amada Company Limited, Kanagawa (JP)

( * ) Notice: Subject to any disclaimer, the term of this patent is extended or adjusted under 35 U.S.C. 154(b) by 0 days.

(21) Appl. No.: 09/701,378

(22) PCT Filed: May 28, 1999

(86) PCT No.: PCT/JP99/02842

§ 371 (c)(1), (2), (4) Date: Nov. 30, 2000

(87) PCT Pub. No.: WO99/63491

PCT Pub. Date: Dec. 9, 1999

(30) Foreign Application Priority Data

Jun. 1, 1998 (JP) .......................................... 10/151602

(51) Int. Cl.[7] .............................................. G05B 19/42
(52) U.S. Cl. ........................ 700/86; 700/206; 700/87; 700/88; 700/89; 700/98; 700/118
(58) Field of Search ....................... 700/18, 23, 86–89, 700/97–98, 118, 159, 160, 163, 165, 145, 206

(56) References Cited

U.S. PATENT DOCUMENTS

| 4,736,306 A | * | 4/1988 | Christensen et al. ......... 345/420 |
| 4,858,149 A | * | 8/1989 | Quarendon ................. 345/419 |
| 5,268,999 A | | 12/1993 | Yokoyama |
| 5,369,265 A | | 11/1994 | Adachi et al. |
| 5,463,558 A | | 10/1995 | Tang et al. |
| 5,587,914 A | * | 12/1996 | Conradson et al. ............ 700/95 |
| 5,689,435 A | | 11/1997 | Umney et al. |
| 5,936,628 A | * | 8/1999 | Kitamura et al. ............ 345/420 |
| 6,144,896 A | | 11/2000 | Kask et al. |
| 6,185,476 B1 | | 2/2001 | Sakai |
| 6,341,243 B1 | * | 1/2002 | Bourne et al. ............... 700/165 |
| 6,490,498 B1 | * | 12/2002 | Takagi ........................ 700/159 |

FOREIGN PATENT DOCUMENTS

| EP | 0187065 | 7/1986 |
| EP | 0402475 | 12/1990 |
| EP | 0419013 | 3/1991 |
| WO | 97/42608 | 11/1997 |

OTHER PUBLICATIONS

Inui et al., "Fast Evaluation of Geometric Constraints for Bending Sequence Planning", Proceedings of the 1998 IEEE International Conference on Robotics and Automation, Leuven, Belgium, pp. 2446–2451, vol. 3, May 1998.

Lin et al., "Sheet Metal Products: Database in Support of Their Process Planning and Surface Development", International Journal of Computer Integrated Manufacturing, vol. 11, No. 6, pp. 524–833, Nov.–Dec. 1998.

* cited by examiner

Primary Examiner—Ramesh Patel
(74) Attorney, Agent, or Firm—Greenblum & Bernstein, P.L.C.

(57) ABSTRACT

An automatic programming apparatus wherein respective planes constituting a solid input from a two-dimensional three-side view drawing are displayed on a screen. When a reference plane and a butting plane are specified within the respective planes, a temporary development diagram is generated in which the butting plane is butted to the reference plane. A solid figure is generated by bending the temporary development diagram based on a bending condition and displayed interlockingly in a region different from a region where the temporary development diagram is displayed. A development diagram obtained by extracting external frame loop and bending lines of the temporary development diagram is transmitted to CAM on a preceding stage.

6 Claims, 19 Drawing Sheets

INTERFERENCE PORTION (GREEN)

SOLID FIGURE AT THE TIME OF
DOUBLE EXTENSION

CORRECTED TEMPORARY
DEVELOPMENT DIAGRAM Cp

FINAL DEVELOPMENT DIAGRAM Qi

AUTOMATIC PROGRAMMING APPARATUS AND STORAGE MEDIUM FOR STORING GRAPHIC DATA GENERATING PROGRAM

TECHNICAL FIELD

The present invention relates to an automatic programming apparatus capable of obtaining an accurate development diagram by carrying out interference simulation and inverse simulation based on a solid figure while displaying a sheet metal development diagram and its perspective view interlockingly on the same screen.

BACKGROUND ART

Recently, line control system has been applied to machine tools (bending machine, laser machine, punching machine, etc.). In such a line control system, as shown in FIG. 1, an automatic programming apparatus (CAE) 1 having CAD/CAM function and a host machine 2 which is a server are disposed in office and these high order apparatuses are connected to machine tools (NCT/laser, bender) on site as lower order apparatus through LAN via a terminal 3, terminal 4 and NC unit 5.

An operator generates a development diagram by imaging a solid figure in the brain based on three side views using CAD function of the automatic programming apparatus 1 so as to obtain a processing program for NCT/laser. After that, with the CAM function, an appropriate tool is allocated for a development diagram generated by the CAD or a laser trajectory is obtained, and such a processing program is transmitted to the host machine 2.

An elongation value is used for generation of the aforementioned development diagram. This elongation value is determined depending on the characteristic of a bender for use and a condition particular for user by referring to an elongation value table.

However, in the conventional automatic programming apparatus, an operator must generate a development diagram by imaging its perspective view in his mind. Therefore, there is a problem that nobody except a skilled operator can generate an accurate development diagram easily if the solid figure is complicated.

Further, because the conventional development diagram has been generated to obtain a processing program for NCT/laser, it cannot be used for a bender if no appropriate treatment is performed, so that it has not been transmitted to the bender.

Further, a preferred development diagram is an accurate development diagram considering interferences between flanges and between a flange and dies. Although the conventional development diagram is produced based on an elongation value table, a preferred development diagram is a development diagram considering actual elongation values on site.

That is, because, in the conventional automatic programming apparatus, the interference with respect to flanges and dies is not checked on CAD side and the development diagram is generated by operator's imaging a solid figure in his mind by using the elongation values table based on the elongation value, table, there is a problem that no accurate development diagram corresponding to on-site condition can be obtained.

DISCLOSURE OF INVENTION

Accordingly, it is an object of the present invention to provide an automatic programming apparatus capable of obtaining an accurate development diagram considering an actual elongation value on site and an interference with respect to flanges and dies easily on the CAD side.

To achieve the above object, according to an aspect of the present invention, there is provided an automatic programming apparatus wherein respective planes constituting a solid input from a two-dimensional three-side view drawing are displayed on a screen; when a reference plane and a butting plane are specified within the respective planes, a temporary development diagram in which the butting plane is butted to the reference plane; a solid figure is generated by bending the temporary development diagram based on a bending condition and displayed interlockingly in a region different from the temporary development diagram; and a development diagram obtained by extracting external frame loop and bending lines of the temporary development diagram is transmitted to CAM on a preceding step, the automatic programming apparatus comprising: graphic editing portion for computing for an interference between respective solid planes of the solid figure so as to notify an interference plane and an interference region of the interference plane as a result of the interference computation; inverse simulation portion for carrying out inverse simulation with specifying dies in succession from a final bending line of the solid figure to carry out the interference computation so as to notify a plane interfering with a die as a result of the interference computation; temporary development diagram correcting portion for reading the results of the interference computations of the graphic editing portion and the inverse simulation portion and correcting the temporary development diagram based on the results of the interference computations; and solid figure generating portion for regenerating a solid figure based on the corrected temporary diagram each time when the temporary development diagram is corrected.

In a preferred embodiment of the present invention, the automatic programming apparatus comprises a plane synthesizing portion for when a side of each of two planes from three planes is specified, regarding one of the two planes as a reference plane and the other plane as a butting plane, butting the specified side of the reference plane with the specified side of the butting plane while possessing an overlapping region corresponding to an elongation value and obtaining the temporary development diagram in which bending lines are entered into the overlapping region; the solid figure generating portion for bending the temporary development diagram expressed on two-dimensional coordinates by affine transformation on three-dimensional coordinates and generating a surface model by attaching a sheet thickness to a shape obtained by bending the temporary development diagram; and perspective view generating portion for erasing shade planes of the surface model obtained by the solid figure generating portion and displaying specified planes in specified colors.

In a preferred embodiment of the present invention, attribute information is attached to the temporary development diagram and the surface model.

In a preferred embodiment of the present invention, the automatic programming apparatus further comprises elongation value information reading portion for determining whether or not there is bending attribute information coinciding with an input bending condition including an elongation value in attribute information file and if that information exists therein, setting the elongation value in the plane synthesizing portion; and finite element method portion for, when it is determined that the bending attribute information does not exist by the elongation value information reading portion, carrying out bending simulation according to elastoplasticity finite element method based on the bending condition, setting an elongation value obtained by the bending simulation in the plane synthesizing portion and storing the elongation value in the attribute information file.

In a preferred embodiment of the present invention, the automatic programming apparatus further comprises a data transmission/reception portion for carrying out transmission and reception of information with a host machine connected through a line.

Further, to achieve the above object, according to another aspect of the present invention, there is provided a computer-readable storage medium for storing a graphic data generation program comprising the steps of: displaying three faces constituting a solid input according to a two-dimensional three-side view drawing on a screen; when a reference plane and a butting plane are specified within the three faces, obtaining a temporary development diagram by butting the butting plane with the reference plane while possessing an overlapping region corresponding to an elongation value; affine-transforming, on three-dimensional coordinates, the temporary development diagram expressed on two-dimensional coordinates; generating a surface model by attaching a sheet thickness to a shape obtained by the affine transformation; erasing shade planes on the surface model and indicating specified planes with specified colors; carrying out interference computation on respective solid planes in the solid figure so as to notify an interference plane and an interference portion of the interference plane as a result of the interference computation; carrying out inverse simulation with specifying dies in succession from a final bending line of the solid figure to carry out the interference computation so as to notify a plane interfering with a die as a result of the interference computation; reading the results of the interference computations of the graphic editing step and the inverse simulation step and correcting the temporary development diagram based on the results of the interference computations; regenerating a solid figure based on the corrected temporary diagram each time when the temporary development diagram is corrected; and generating a development diagram by extracting an external frame loop of the corrected temporary development diagram and bending lines.

The nature, principle and utility of the invention will become more apparent from the following detailed description when read in conjunction with the accompanying drawings.

BEST MODE FOR CARRYING OUT OF THE INVENTION

First Embodiment

Figure 2:
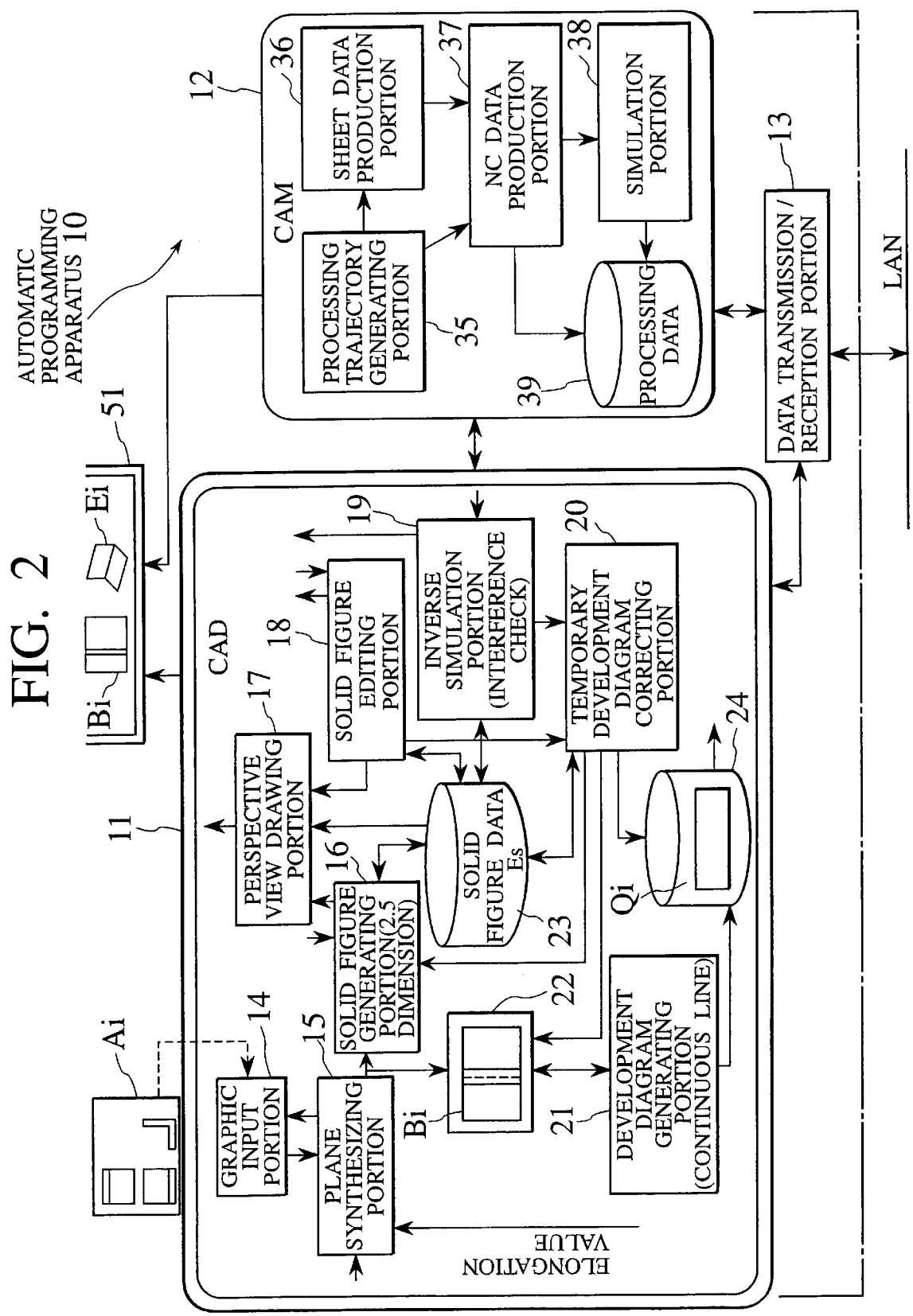
FIG. 2 is a schematic structure diagram of a first embodiment of a sheet metal integrated support system of the present invention.
Figure 3:
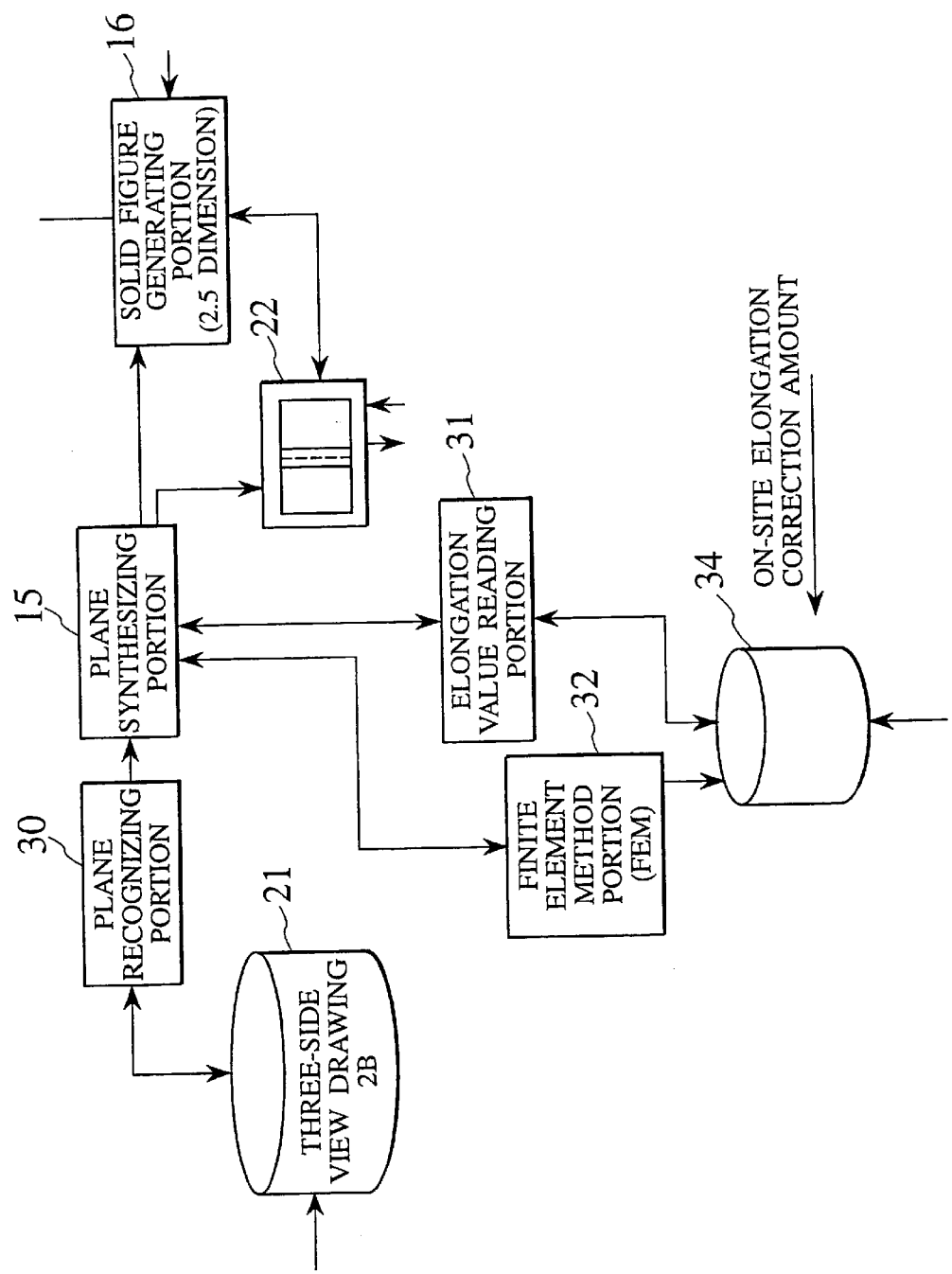
FIG. 3 is a partial diagram of the first embodiment of the sheet metal integrated support system of the present invention.

FIG. 2 is a schematic structure diagram of an automatic programming apparatus of the first embodiment of the sheet metal integrated support system of the present invention. This automatic programming apparatus 10 comprises a 2.5-dimensional CAD 11, CAM 12 and data transmission/reception portion 13. Each face input based on a three-side view drawing Ai (two-dimensional) is displayed on a screen 51. By communicating with a host machine (not shown), the automatic programming apparatus 10 transmits on-site bending attribute information (elongation value data) accumulated in the host machine and generates a solid figure Ef according to a plane synthesized diagram Bi (called temporary development diagram also) based on this elongation value.

Then, this automatic programming apparatus 10 is capable of displaying the perspective view Ei based on this solid figure Ef with the screen 51 interlockingly and carries out an interference check for a butting position on the perspective view Ei and inverse simulation using the solid figure Ef. After that, the plane synthesized diagram Bi is corrected, an accurate development diagram Qi is obtained by drawing this plane synthesized diagram Bi with a continuous line.

The CAM 12 generates a processing program including processing trajectory, specification on dies and the like based on the development diagram Qi obtained from the CAD 11 and transmits it to a machine tool.

The automatic programming apparatus 10 of this embodiment contains the data transmission/reception portion 13 for communicating with the host machine so as to transmit the elongation value information and the like.
(Structure of CAD)

As shown in FIG. 2, the CAD 11 comprises a graphic input portion 14, a plane synthesizing portion 15, a solid figure generating portion 16, a perspective view drawing portion 17, a solid figure editing portion 18, an inverse simulation portion 19, a temporary development diagram correcting portion 20 and a development diagram generating portion 21.

The graphic input portion 14 stores respective planes constituting a solid based on the three-side view drawing Ai input by an operator in a memory 22.

When the plane synthesizing portion 15 specifies a side for each of two planes of respective planes stored in the memory 22 through a mouse or key board (not shown), a closed loop having the former specified side is regarded as a reference plane and a closed loop having the latter specified side is regarded as a butting plane.

The plane synthesizing portion 15 generates the plane synthesized diagram Bi by moving the butting face so that the specified side of the butting plane matches the specified side of the reference plane (overlapping region) on the memory 22 and displays it on the screen 51. This plane synthesized diagram Bi has an overlapping region corresponding to the elongation value.

If the elongation value is set, the plane synthesizing portion 15 shortens the entire dimension of the plane synthesized diagram Bi and corrects it so that the overlapping region is enlarged so as to add a bending line to this overlapping region (called bending region also). This bending line information is constituted of a line number, a line type, elongation value and the like.

The solid figure generating portion 16 generates a solid model (surface model) by bending the plane synthesized diagram Bi expressed on two-dimensional coordinates in the memory 22 according to a bending angle θ and bending direction on three-dimensional coordinates (based on mainly the bending line) and stores respective coordinates of this solid model in the solid figure data file 23. That is, this CAD is 2.5-dimensional CAD rather than the three-dimensional CAD. Generation of this solid figure will be described later.

The perspective view generating portion 17 fetches data of the solid figure Ef generated by the solid figure generating portion 16 and displays the perspective view Ei projected to a screen space on the screen. The perspective view generating portion 17 has functions for rotation, coloring, enlargement and the like.

The solid figure editing portion 18 carries out solid figure interference computation on the solid figure Ef stored in the solid figure file 23 and interference computations for butting, overlapping and the like, and displays these results on the perspective view generating portion 17. This solid figure editing portion 18 will be described in detail with reference to figures.

The inverse simulation portion 19 carries out interference checks on dies and flanges by opening the solid figure Ef in an inverse order.

The temporary development diagram correcting portion 20 reads correction values based on the interference check of the solid figure editing portion 18 and inverse simulation portion 19 and corrects the plane synthesized diagram Bi according to this correction value.

The development diagram generating portion 21 extracts an external frame loop (drawn with a continuous line) of the plane synthesized diagram Bi and registers a development diagram Qi in which a bending line is entered into this external frame loop with correspondence to part numbers in the development diagram file 24. recognizing portion 30, an elongation value reading portion 31, a finite element method portion 32 and the like.

The plane recognizing portion 30 stores information of respective planes constituting a solid based on three-side view drawing in the memory 31 and recognizes the planes by tracing the closed loop.

The elongation value reading portion 31 displays a dialog for inputting such bending condition Ji as sheet thickness, material, bending angle, bending type and the like, determines whether or not there is bending attribute information Fi coinciding with the bending condition Ji set in this dialog in the file 34 and if there is such information therein, sets its elongation value in the plane synthesizing portion 15.

If there is no elongation value coinciding with the bending condition Ji in the file 34, the finite element method portion 32 is activated and that bending condition is transmitted to the finite element method portion 32.

Figure 4:
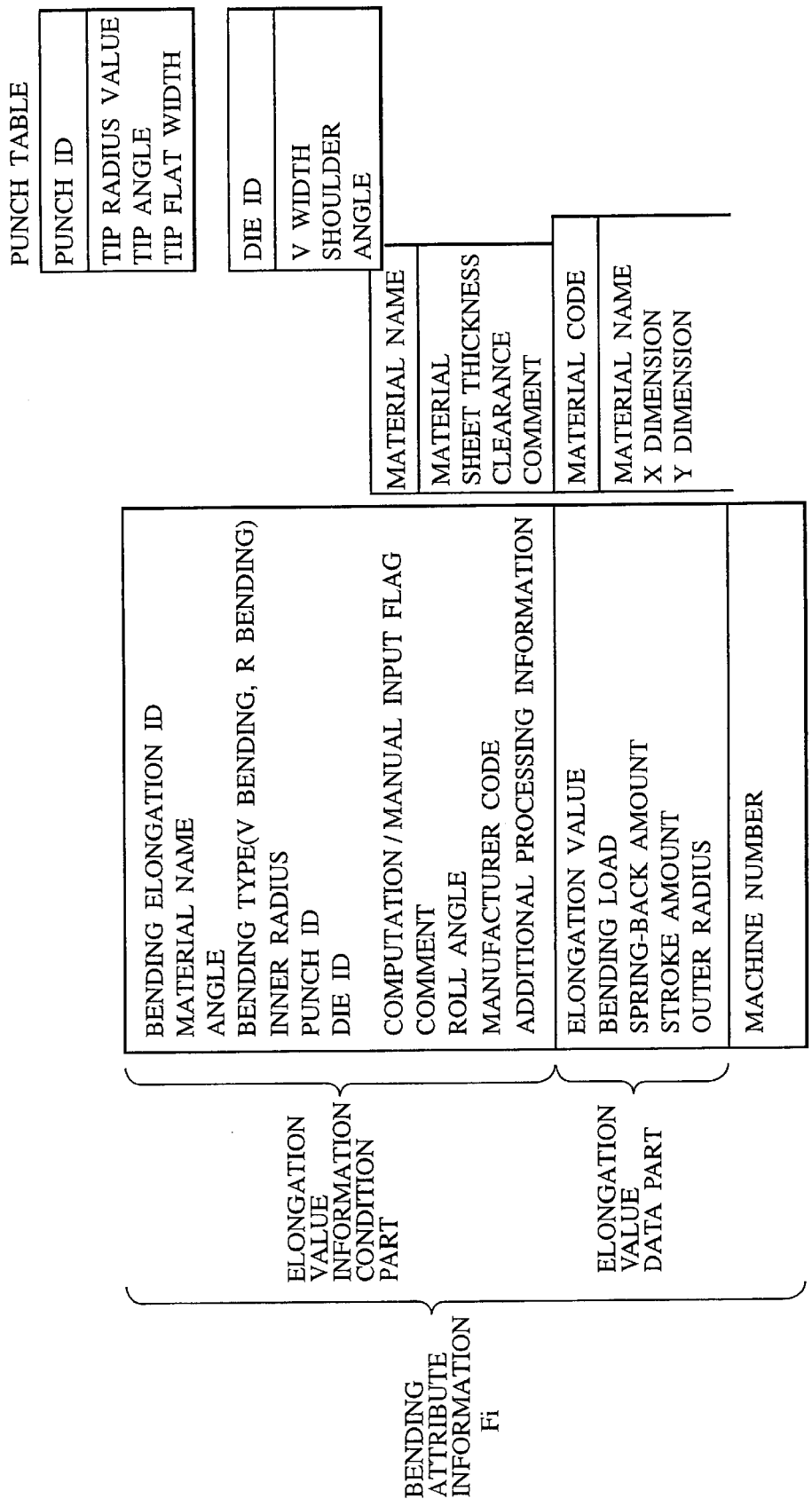
FIG. 4 is an explanatory diagram for explaining bending attribute information.
Figure 5:
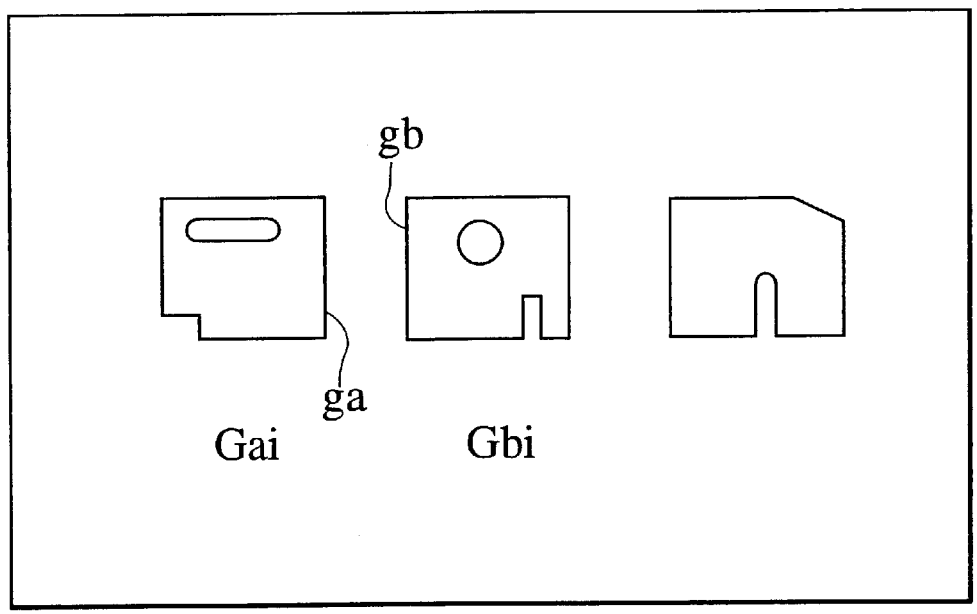
FIG. 5 is an explanatory diagram for explaining an indication of closed loop.

As shown in FIG. 4, the bending attribute information Fi to be transmitted from the host machine comprises elongation value information condition portion containing machine number, bending elongation ID, material name and the like, and elongation value data portion containing elongation value, spring-back amount and the like.

The finite element method portion 32, by reading material, bending angle, bending direction and the like based on the bending condition Ji, obtains an object stroke amount of a punch so as to obtain that bending angle, deflects a work using the elastoplasticity finite element method following this object stroke amount, and then obtains an elongation value when this deflection angle coincides with the bending angle.

The finite element method portion 32 sets this elongation value on the plane synthesizing portion 15 instead of the elongation value reading portion 31 and stores the obtained elongation value and a bending condition Ji used for obtaining this elongation value in the file 34.
(Structure of CAM)

The CAM 12 comprises a processing trajectory generating portion 35, a sheet data production portion 36, a NC data production portion 37, a simulation portion 38 and the like. Then, the CAM 12 obtains a processing trajectory on a work based on a development diagram generated on the CAD so as to obtain an accurate NC data for NCT, laser and the like.

An operation of the automatic programming apparatus according to the first embodiment having such a structure will be described below.

The automatic programming apparatus of this embodiment has a key board (not shown), a mouse and a multi-window display/control portion for controlling respective programs, and executing multi-window display, and displays the plane synthesized diagram Bi and perspective view Ei.

First of all, the plane recognizing portion 30 carries out plane recognition processing. This plane First of all, the plane recognizing portion 30 carries out plane recognition processing. This plane recognition processing is carried out by tracing sides (for example, ga, gb) of respective planes (Gi; Gai, Gbi, . . . ) constituting a solid based on a three-side view drawing displayed on the screen 51 according to a specification of the planes.

Figure 6:
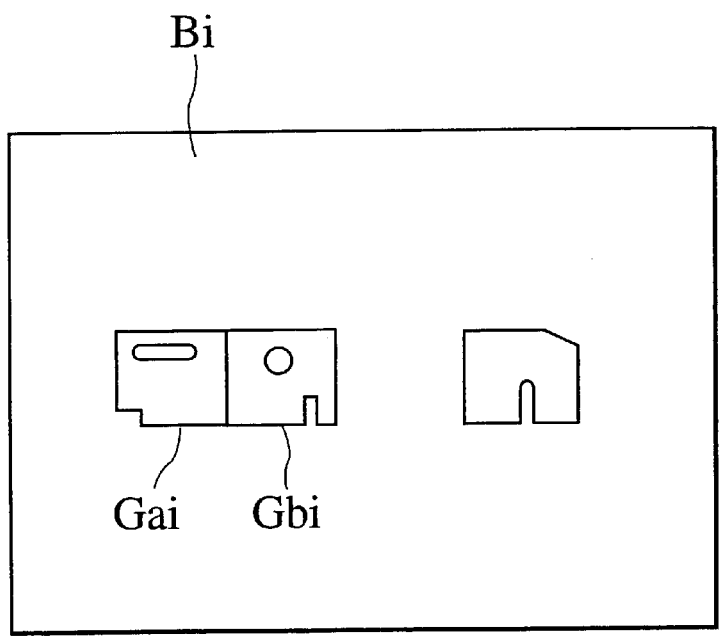
FIG. 6 is an explanatory diagram for explaining lane synthesizing processing.

Next, the plane synthesizing portion 15 carries out butting processing. If a single side of each of two closed plane G loops Gi (Gai, Gbi) displayed on the screen 51 is specified with a mouse or key board (not shown), a synthesized diagram Bi in which planes are butted with each other is obtained on the screen 51 as shown in FIG. 6.

Figure 7:
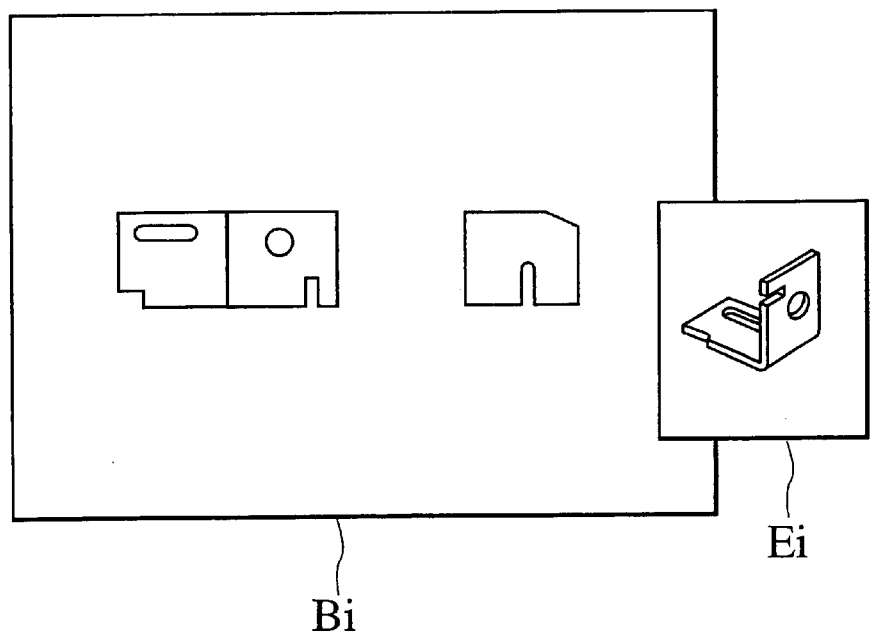
FIG. 7 is an explanatory diagram for explaining an interlocking indication of a temporary development diagram and a perspective view.

On the other hand, at the same time when the butting processing is executed, the solid figure generating portion 16 is activated so as to activate perspective view display processing for displaying a perspective view Ei based on the plane synthesized diagram Bi on the screen 51. That is, as shown in FIG. 7, the plane synthesized diagram Bi and perspective view Ei are displayed at the same time.

Specifically, the solid figure generating portion 16 generates a solid model (surface model) by bending the plane synthesized diagram Bi expressed by two-dimensional coordinates in the memory 22 according to the bending angle θ and bending direction on three-dimensional coordinates (based on bending line).

The solid figure generating portion 16 transmits a surface model solid figure to the perspective view generating portion 17.

The perspective view generating portion 17 eliminates shade planes and colors other planes of the surface model solid figure so as to generate a perspective view Ei and displays it on the screen 51.

Therefore, a perspective view (solid modeled perspective view) is displayed interlockingly with a temporary development diagram Bi on the screen 51.

This perspective view can be enlarged and rotated. The enlargement and rotation are instructed through a mouse. The processings for the enlargement and rotation are performed by three-dimensional affine transformation.

On the other hand, the solid figure editing portion 18 carries out interference computation on the surface model. If an interference portion is detected, an instruction for displaying that interference portion in, for example, green is transmitted to the perspective view generating portion 17 and an interference check result screen is displayed on the screen 51 as shown in FIG. 8.

Figure 8:
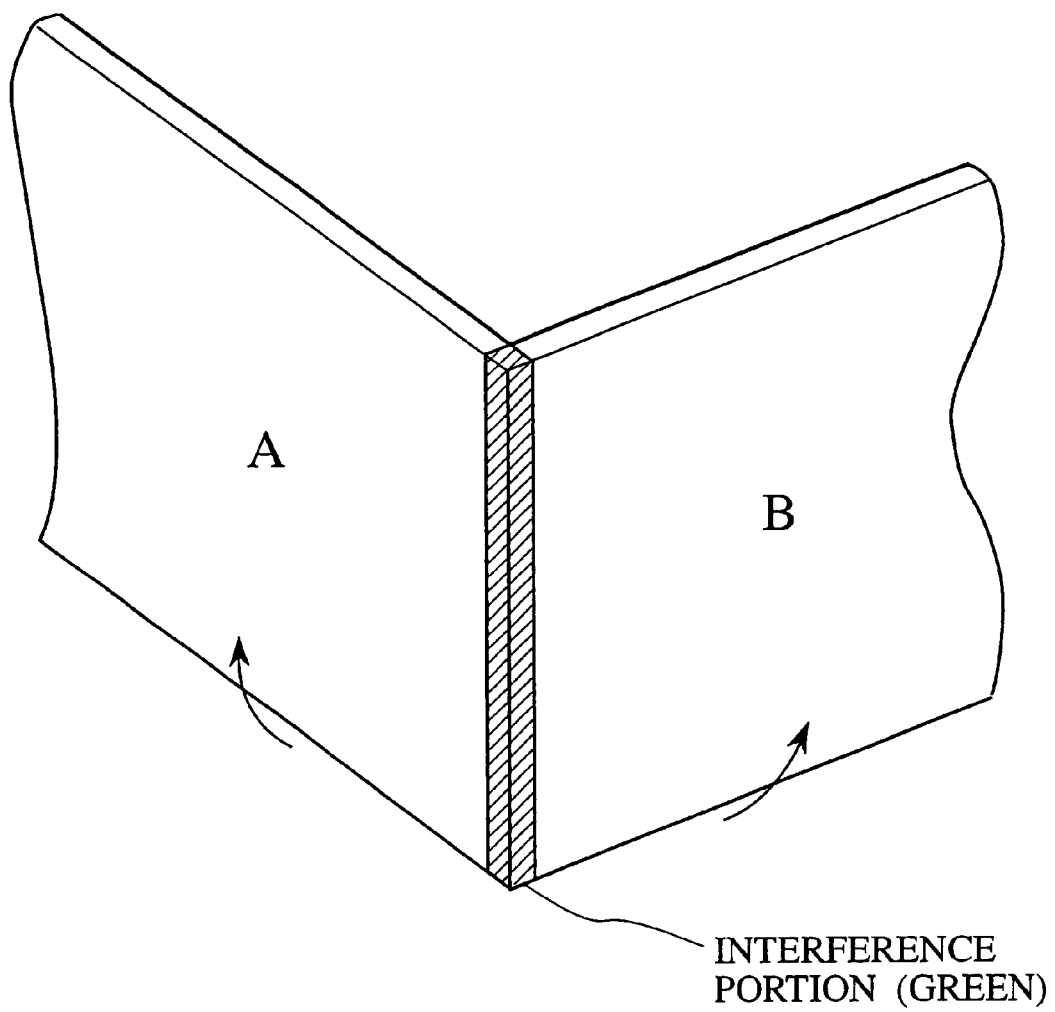
FIG. 8 is an explanatory diagram for explaining an interference position in the solid figure.

On the interference check screen of FIG. 8, when the solid planes A and B are raised up in directions of arrows, end portions of both the planes overlap each other.

Figure 9:
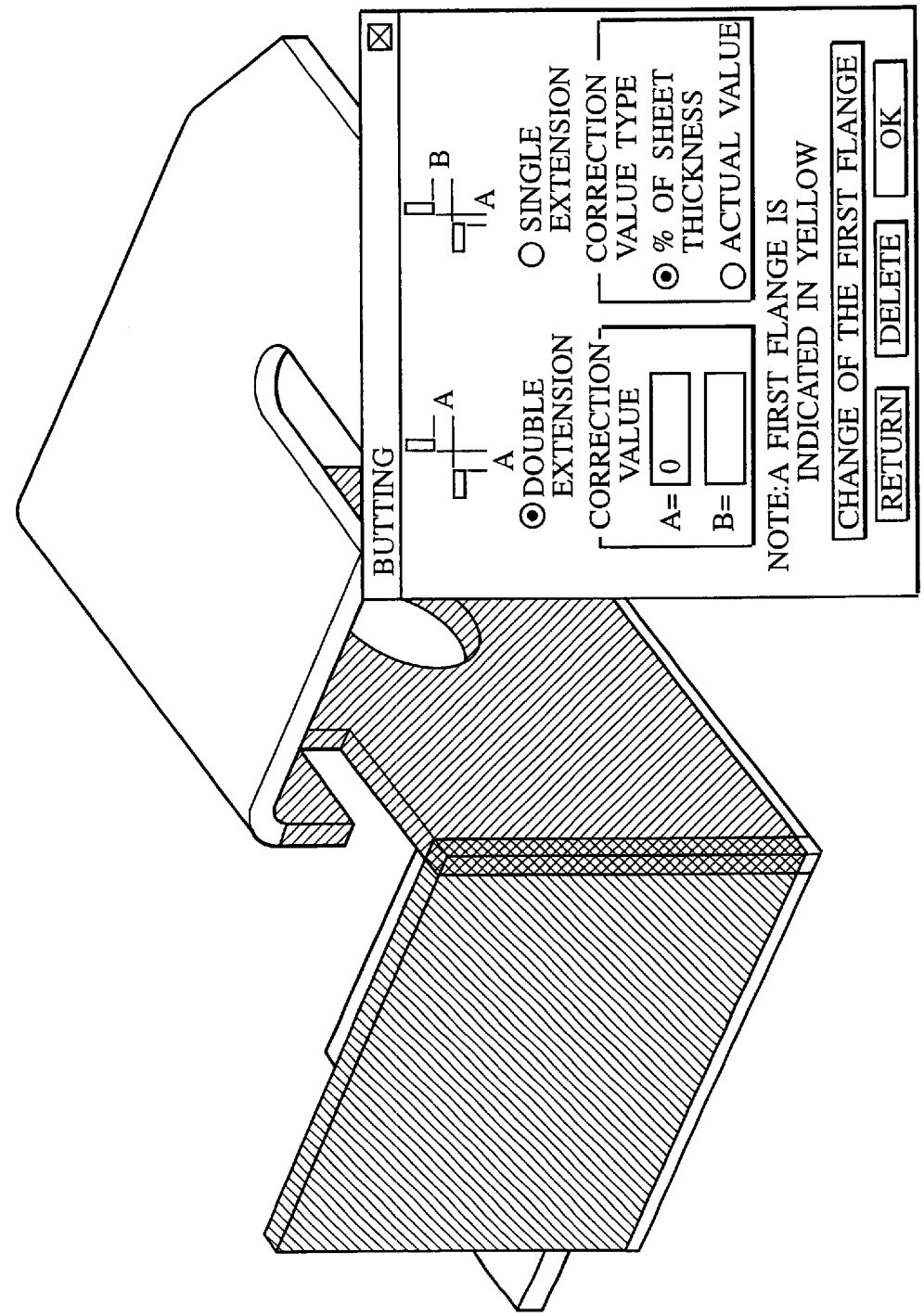
FIG. 9 is an explanatory diagram for explaining butting edition on a solid figure.

The solid figure editing portion 18 displays a butting dialog shown in FIG. 9 and by butting a first flange and a second flange on the interference check screen, displays the flanges in different colors using the perspective view generating portion 17 according to a dialog setting condition.

Figure 10:
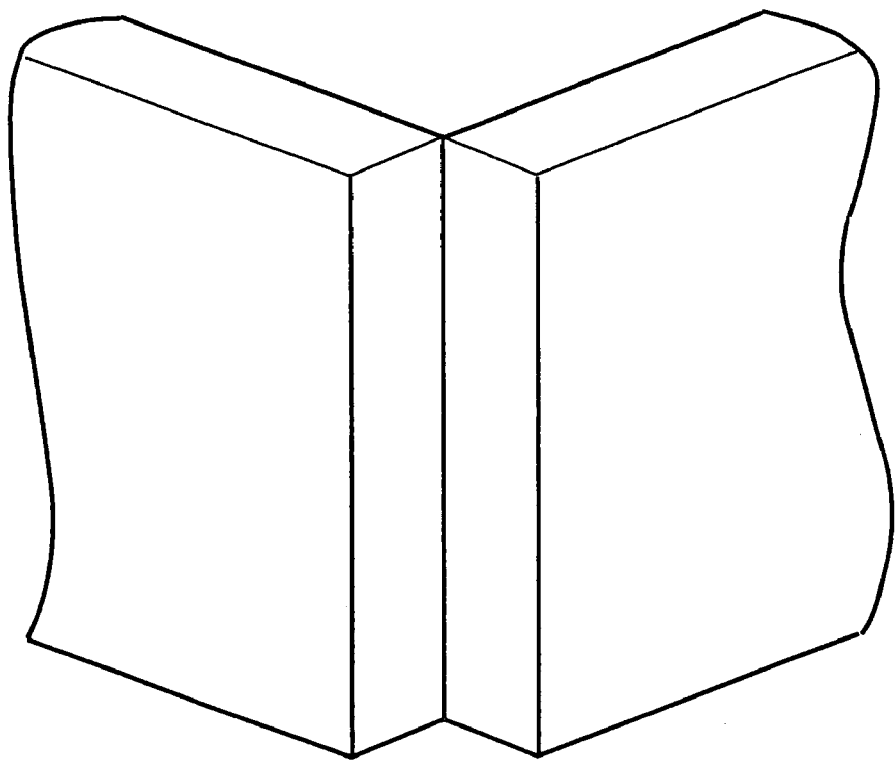
FIG. 10 is an explanatory diagram for explaining a solid figure in case of butting edition by double extension.

For example, the first flange and second flange are indicated in yellow and red respectively as shown in FIG. 9. In single extension mode, the solid figure editing portion 18 displays a side to be subjected to single extension (yellow) by extending it long. On the other hand, if double extension mode is selected in the butting dialog, the solid figure editing portion 18 erases the interference portions of both the planes as shown in FIG. 10.

The solid figure editing portion 18 transmits a region of the interference planes of the solid figure to the temporary development diagram correcting portion 20.

If a region of the interference plane is input, the temporary development diagram correcting portion 20 erases a region hi indicated by this region from the synthesized diagram Bi.

Figure 1:
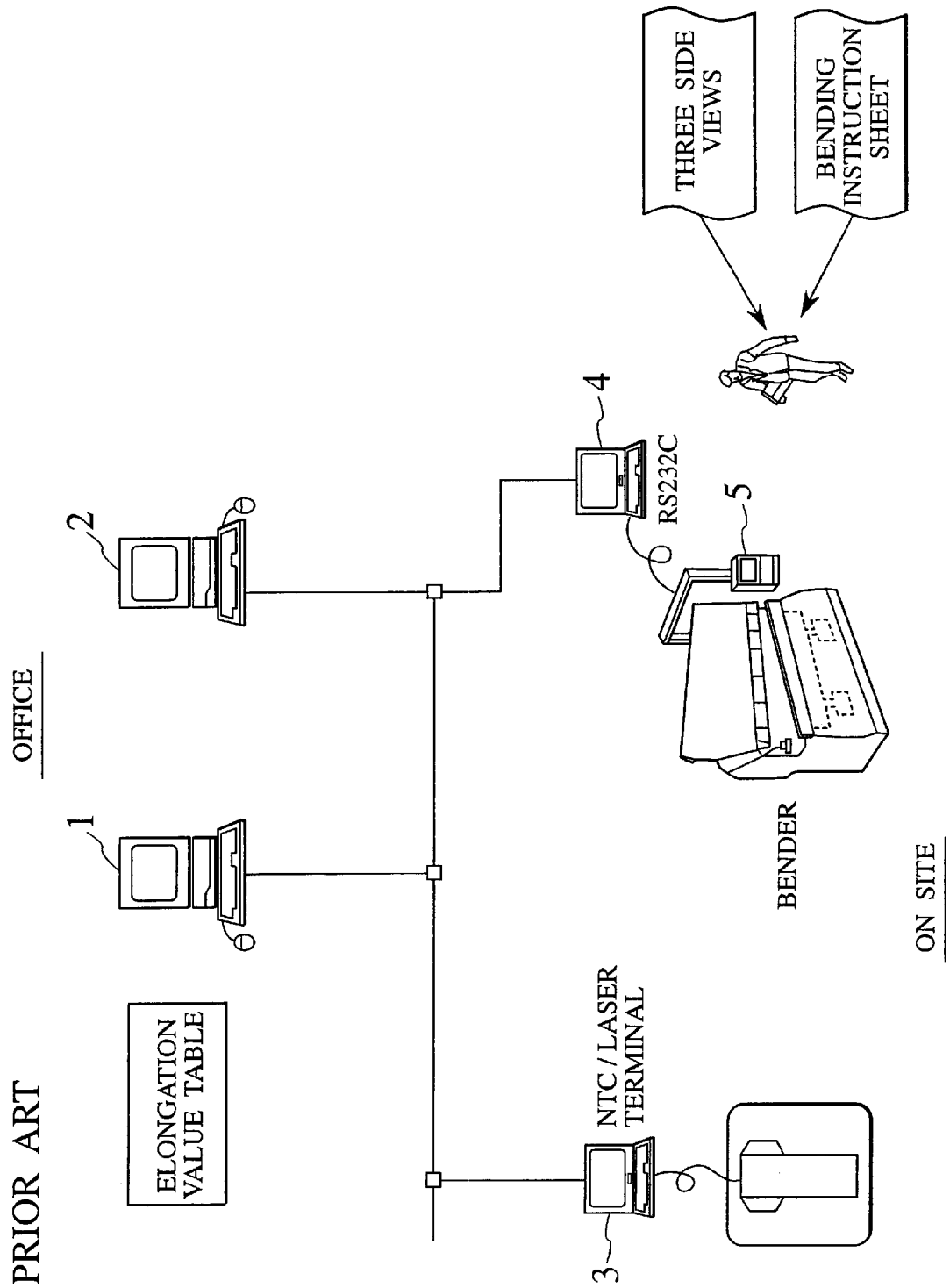
FIG. 1 is a schematic structure diagram of a conventional machine tool line control system.
Figure 11A:
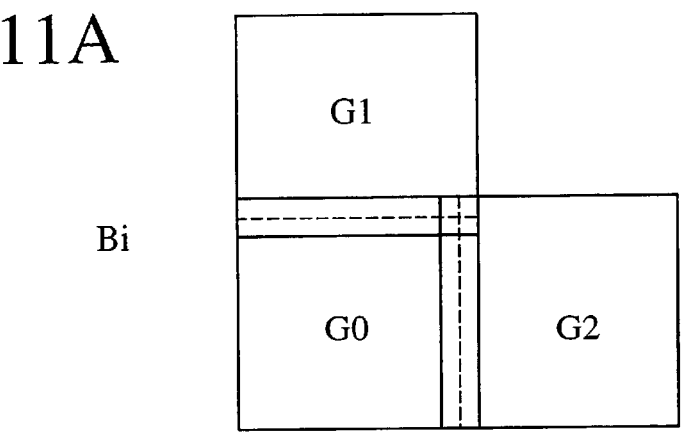
FIGS. 11A–11C are explanatory diagrams for explaining a correction of the temporary development diagram.
Figure 11B:
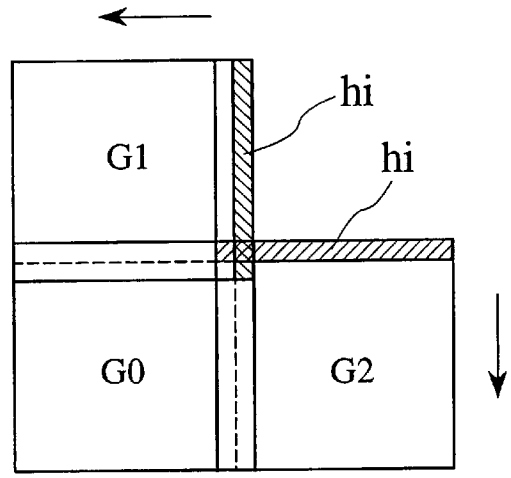
Figure 11C:
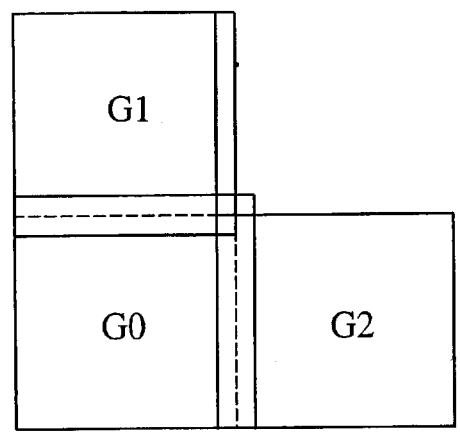

For example, assume that the plane synthesized diagram Bi shown in FIG. 1A is generated. If the double extension mode is specified, a region hi of the plane synthesized diagram Bi as the interference region in the solid figure shown in FIG. 11B is erased so as to obtain a corrected temporary development diagram CP shown in FIG. 1C. Therefore, in a solid figure obtained by rendering the plane synthesized diagram of FIG. 11B solid again, no planes overlap each other at the butting portion as shown in FIG. 10.

The solid figure editing portion 18 carries out overlapping edition. The solid figure editing portion 18 carries out interference computation for the first flange ma and second flange mb of the solid figure Ef in the file 23 and displays its result on the screen.

Figure 12:
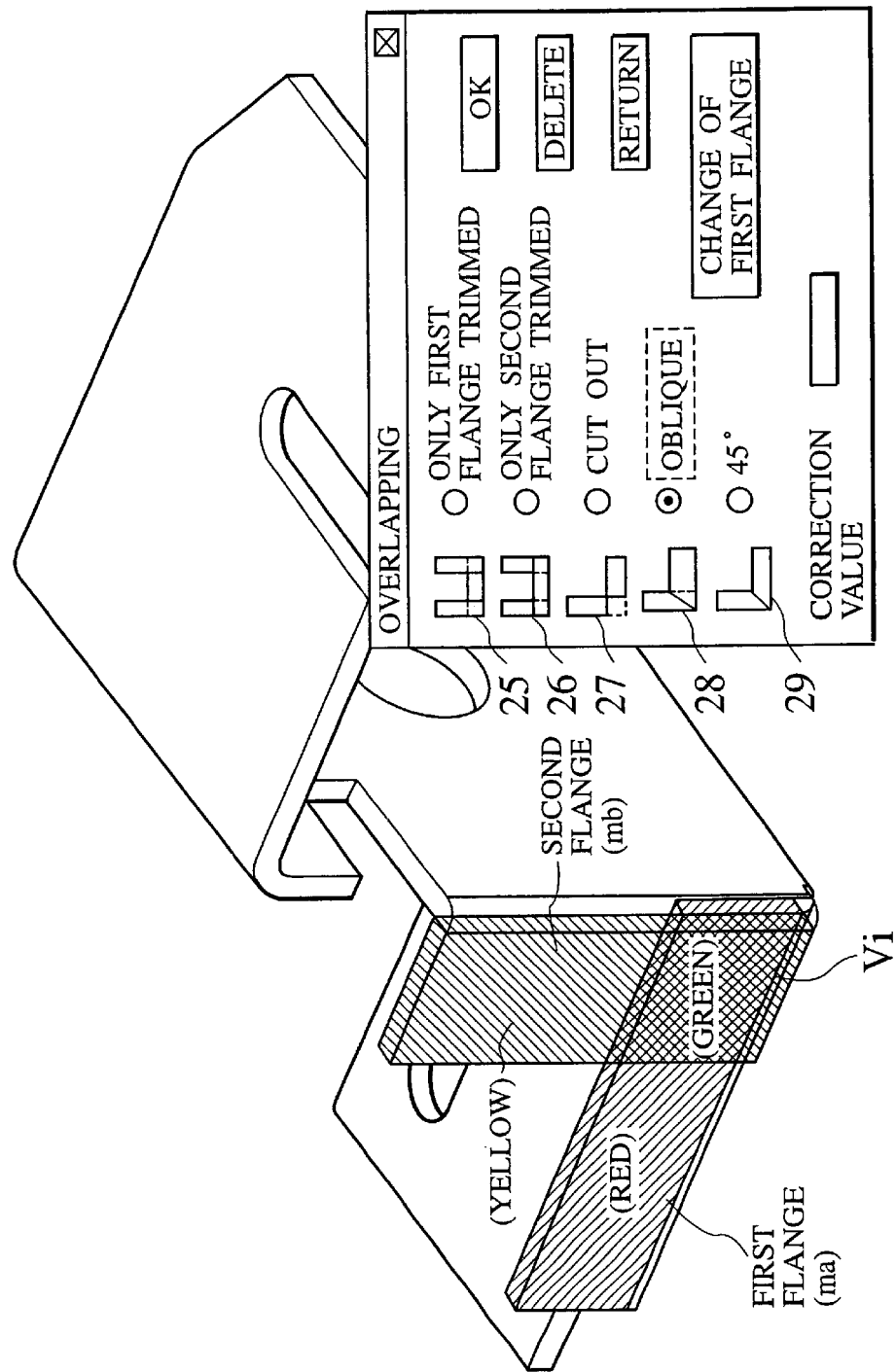
FIG. 12 is an explanatory diagram for explaining an overlapping edit screen.

In the perspective view Ei of FIG. 12, the first flange ma of a bending side is indicated in red, the second flange mb is indicated in yellow and an interference region vi of both the flanges is indicated in green.

Further, an edition dialog for overlapping is displayed. In this overlapping edition dialog, mode indication 25 for cutting an interfering region vi of the second flange while saving the first flange, mode indication 26 for cutting an interfering region vi of the first flange while saving the second flange, mode indication 27 for cutting interfering regions vi of the first and second flanges, mode indication 28 for cutting an interfering region Vi obliquely, mode indication 29 for cutting the interfering region vi at an angle of 45° and the like are selectable. The overlapping edition dialog has a column space for inputting a width (correction amount) for cutting the interfering region vi.

Figure 13:
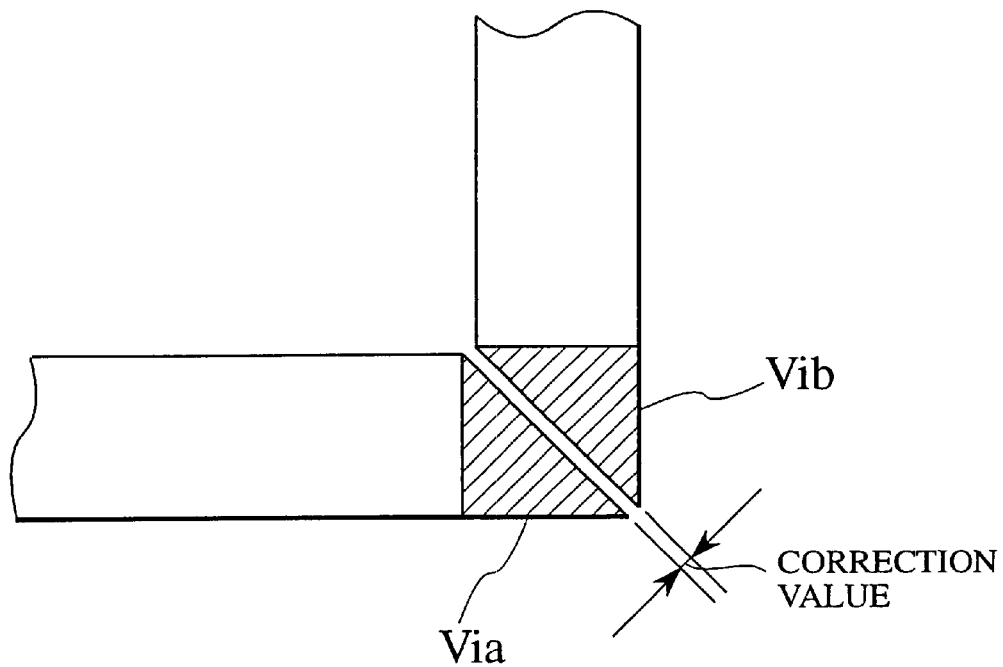
FIG. 13 is an explanatory diagram for explaining a result of correction on the overlapping edit screen.

Then, in the overlapping edition dialog of FIG. 12, if the mode indication 29 for cutting the interfering portion vi at the angle of 45° is selected and a correction amount is input, the solid figure editing portion 18 cuts the interfering portions vi (via, vbi) of the flange faces at the angle of 45° as shown in FIG. 13 and at the same time, adjusts a gap between the flange faces to a gap corresponding to the correction amount.

On the other hand, the temporary development diagram correcting portion 20 reads the correction amount, the mode (mode indication 29 for cutting the interfering portion vi at the angle of 45°) and the interfering portion vi on the interfering faces (for example, first and second flanges) and then carries out a processing described below.

Figure 14A:
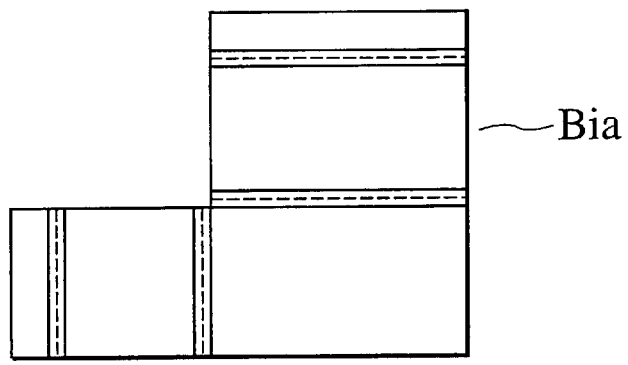
FIGS. 14A–14C are explanatory diagrams for explaining a correction of a temporary development diagram by overlapping edition.
Figure 14B:
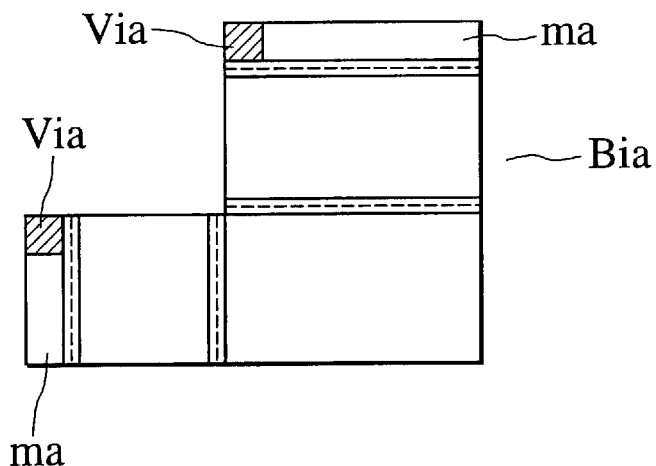

If with the temporary development diagram Bia shown in FIG. 14A stored in the memory 22, the solid figure editing portion 18 computes an interfering portion Vi (via, vib) shown in FIG. 13, the temporary development diagram correcting portion 20 specifies the interfering portion Vi (via, vib) on the temporary development diagram Bia shown in FIG. 14B.

Figure 14C:
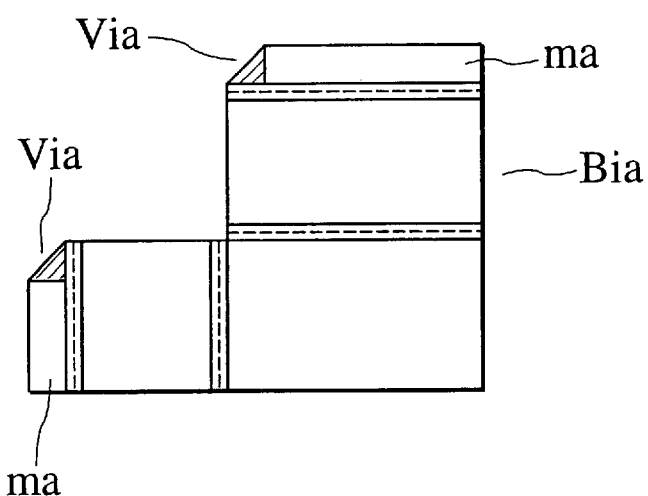

Then, the temporary development diagram correcting portion 20 obtains a temporary development diagram by cutting a region corresponding to 45° from the interfering portion Vi (via, vib) as shown in FIG. 14C.

The inverse simulation portion 19 checks an interference between the flanges and dies by opening with a specified die in succession from a final bending line to check for an interference between the flanges and dies.

Figure 15:
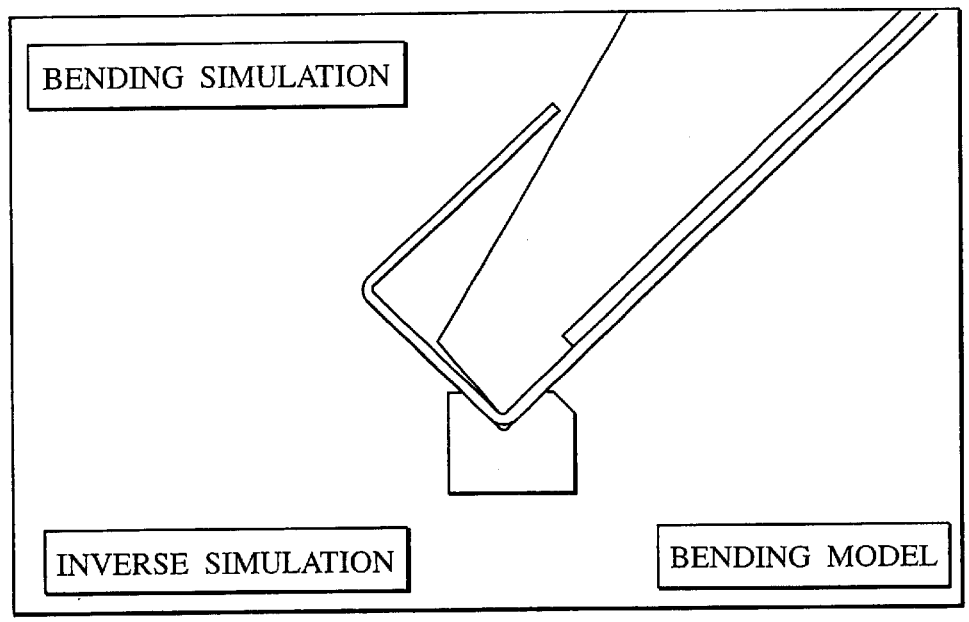
FIG. 15 is an explanatory diagram for explaining a display screen for inverse simulation.

In this inverse simulation, for example, a perspective view indicating a section of a solid figure shown in FIG. 15 is obtained from a surface model and displayed on the screen. Referring to FIG. 15, the inverse simulation portion 19 displays a sectional view of a specified die by butting the die to a bending line and carries out inverse simulation according to bending angle, bending direction, elongation value, bending type and the like of the attribute information attached to the bending line so as to check for an interference by opening faces, and notifies the temporary development diagram correcting portion 20 of its result. The temporary development diagram correcting portion 20 divides the plane synthesized diagram Bi if there is an interference of the dies.

That is, in the automatic programming apparatus 10 of this embodiment, the CAD 11 carries out inverse simulation before the CAM 12 does. Therefore, interference check can be performed by the inverse simulation prior to transfer of a development diagram including the attribute, to the CAM 12 on a subsequent step. As a result, a processing program (NC data) can be generated quickly.

Figure 16:
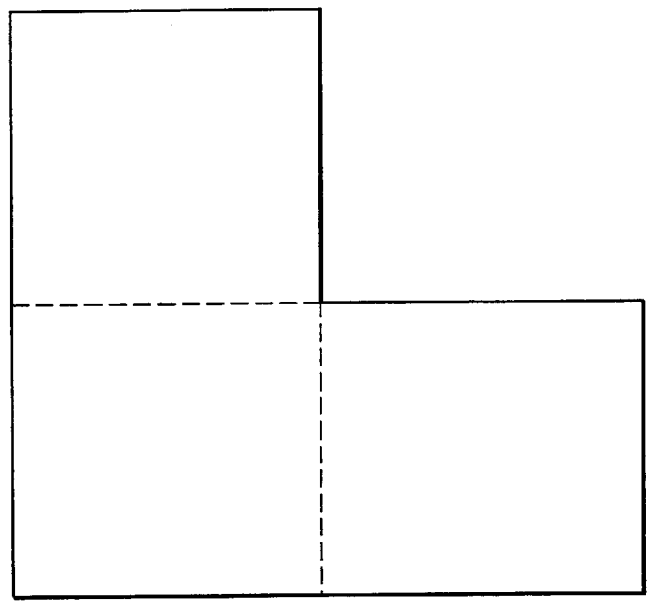
FIG. 16 is an explanatory diagram for explaining generation of a final development diagram.

When solid figure edition and correction of the temporary development diagram by inverse simulation are completed, the development diagram generating portion 21 traces a closed loop (excluding the bending line) of this temporary development diagram and registers trajectories constituting a maximum closed loop shown in FIG. 16 as a final development diagram Qi by adding a product number thereto. Attribute information such as the elongation value, dies and the like is attached to this final development diagram Qi. Further, with this development diagram Qi, a surface model, perspective view, dimensions and the like are registered.

Figure 17:
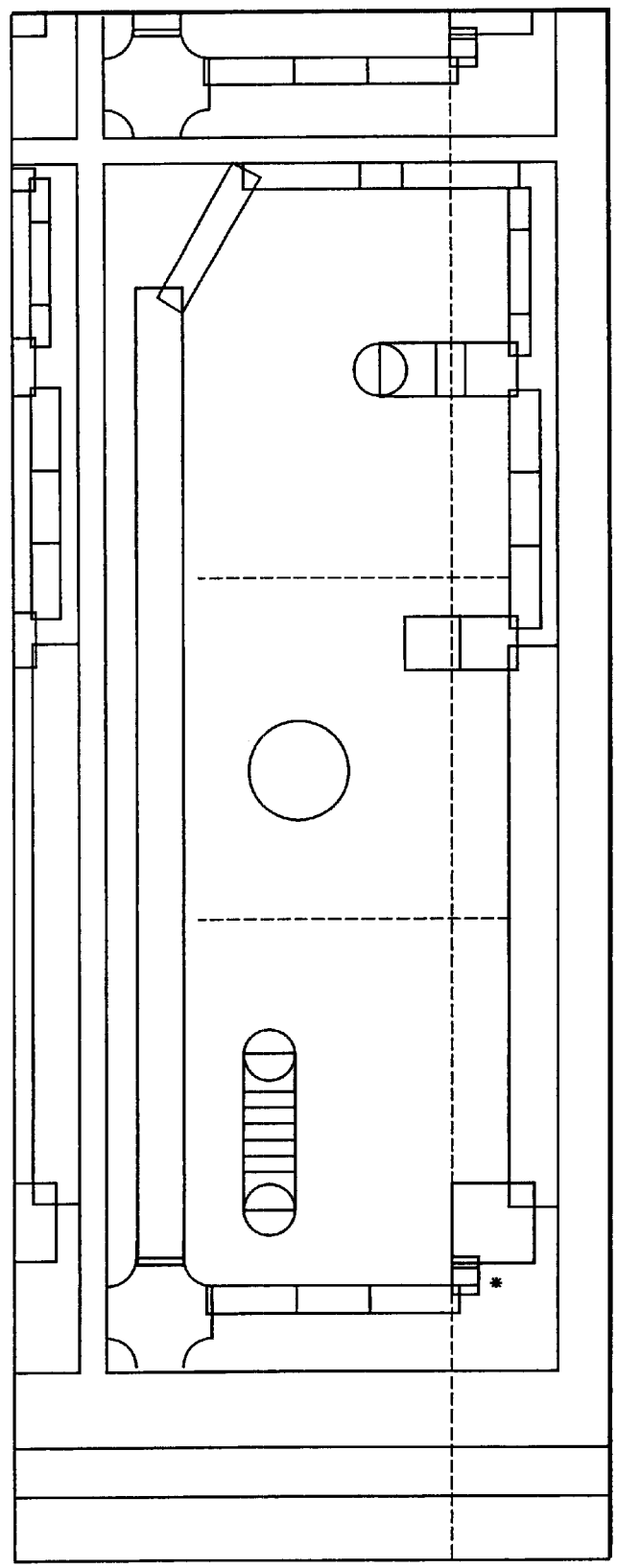
FIG. 17 is an explanatory diagram for explaining a display screen on CAM.

On the other hand, the CAM 12 displays a screen in which a development diagram Qi is input from the CAD 11 and allocation of dies to a workpiece is carried out as shown in FIG. 17.

Second Embodiment

Figure 18:
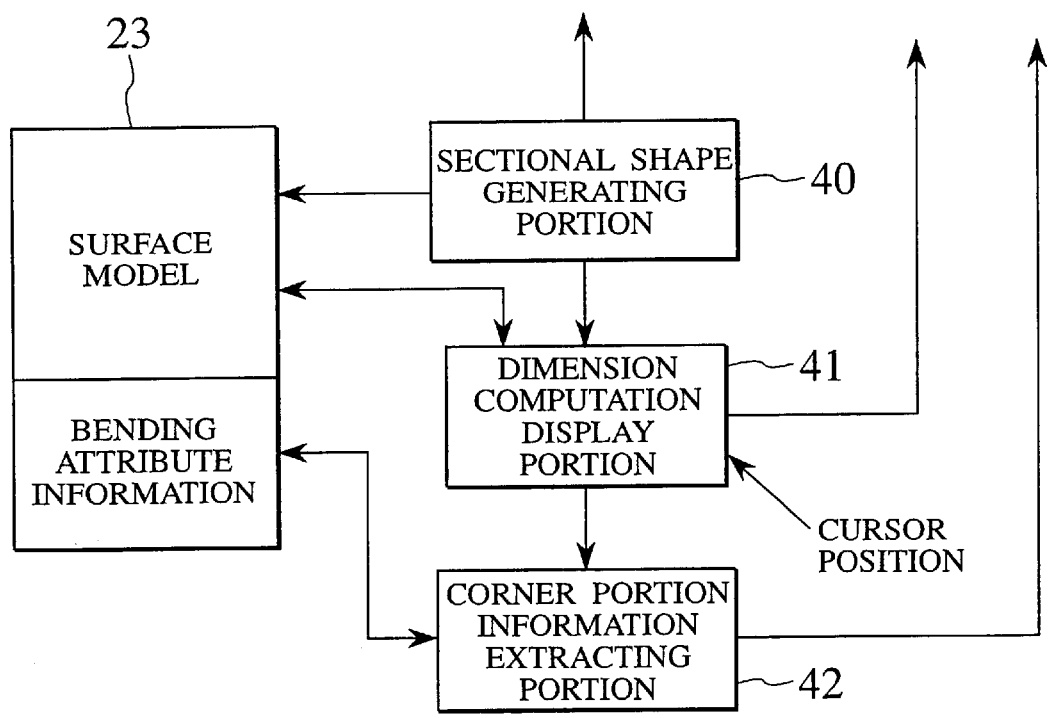
FIG. 18 is a schematic structure diagram of a second embodiment of the sheet metal integrated support system of the present invention.

FIG. 18 is a schematic structure diagram of a second embodiment. The same figure indicates only a portion different from the first embodiment. The second embodiment comprises a sectional shape generating portion 40, a dimension computation display portion 41, and a corner portion information extracting portion 42.

Figure 19:
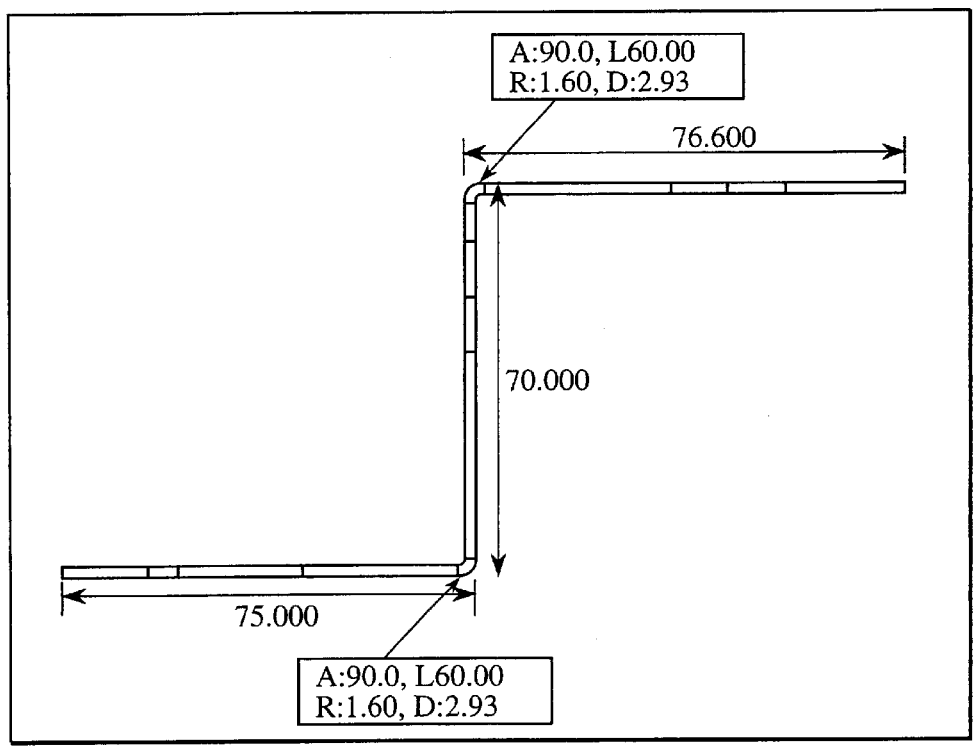
FIG. 19 is an explanatory diagram for explaining indications of dimensions on a sectional view.

The sectional shape generating portion 40 generates a sectional view (wire frame) when the surface model is viewed from a predetermined side (corner portion is indicated with a different color line) and displays its sectional diagram as shown in FIG. 19.

The dimension computation display portion 41 computes dimensions of the sectional view generated by the sectional shape generating portion 40 and this computation result is attached to respective lines constituting the sectional view as shown in FIG. 19.

The corner portion information extracting portion 42 extracts information of the corner portion relating to the sectional view (inner radius, elongation value D, depth) from the surface model and this information is displayed in the vicinity of the corner portion in numerical value.

By displaying computed dimensions and corner information on the sectional view of the wire frame, it is possible to determine whether or not respective planes having proper dimensions have been input, for example, according to a three-side view drawing.

Further, because a depth is also attached to the corner information, it is possible to confirm the entire dimensions with such sectional view.

Figure 20:
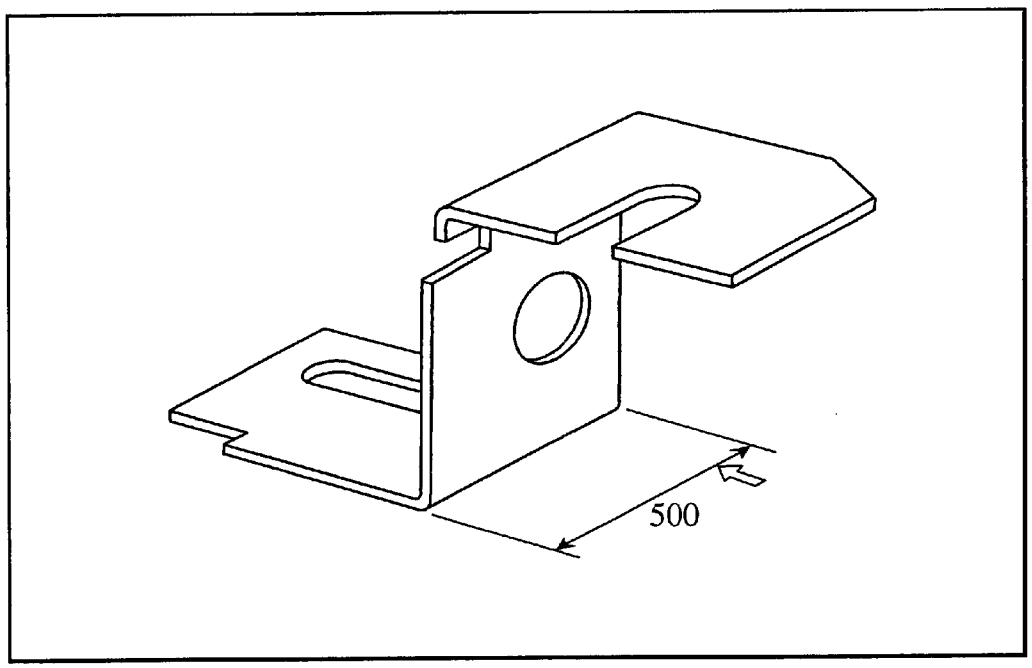
FIG. 20 is an explanatory diagram for explaining indication of dimensions.

The dimension computation display portion 41 is capable of displaying a dimension by following a cursor movement on the screen as shown in FIG. 20.

Figure 21A:
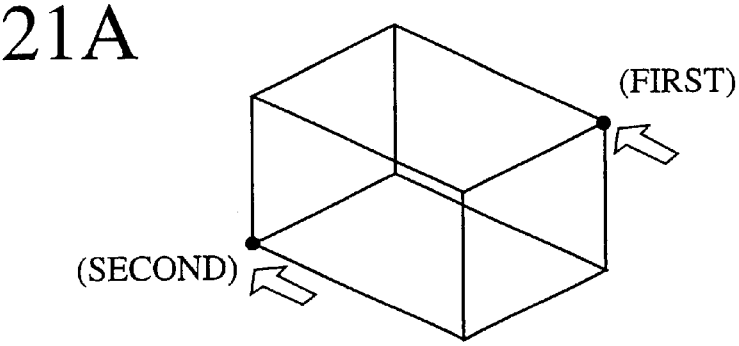
FIGS. 21A–21C are explanatory diagrams for explaining generation of dimension indication.
Figure 21B:
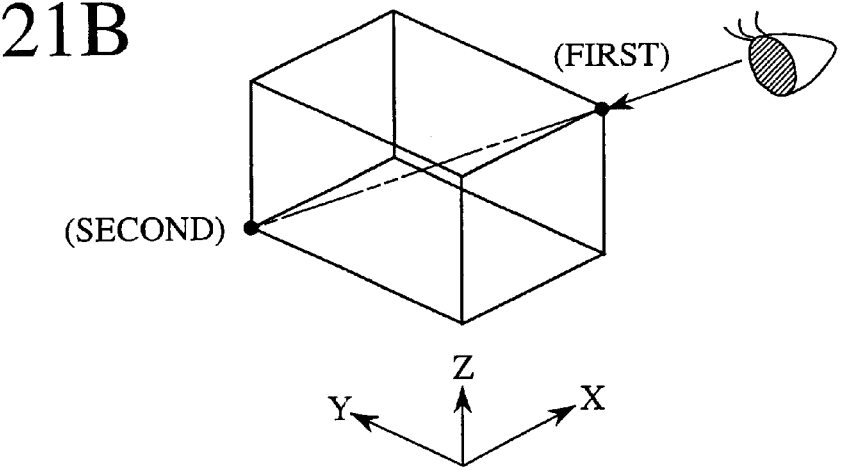
Figure 21C:
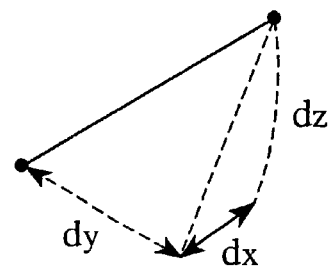

This dimension indication is carried out as follows. For example, as shown in FIG. 21A, two apexes are specified in a perspective view with a cursor, and then as shown in FIG. 21B, a line vector connecting an apex specified with the cursor first with a next specified apex is obtained. Then, as shown in FIG. 21C, dimensions of the line vector on three-axis components are obtained.

It should be understood that many modifications and adaptations of the invention will become apparent to those skilled in the art and it is intended to encompass such obvious modifications and changes in the scope of the claims appended hereto.

INDUSTRIAL APPLICABILITY

As described above, according to the present invention, a perspective view based on a development diagram is indicated on the screen and interference portions between respective planes of the perspective view are indicated in different colors.

Further, a development diagram is corrected based on a moving direction and moving amount of solid planes moved on this perspective view and the perspective view is displayed based on this temporary development diagram again. Then, inverse simulation in which the perspective view is developed in succession from a final bending line with specifying dies is carried out to compute for an interference.

Next, a result of this interference computation is reflected on the temporary development diagram and the temporary development diagram is corrected. Then, an external frame of the temporary development diagram is obtained and a development diagram in which a bending line is input to this external frame is obtained as a final development diagram.

Thus, prior to transfer to the CAM side, the temporary development diagram and perspective view can be displayed interlockingly on the screen and interferences with respect to the flanges and dies can be verified easily according to colors attached to the perspective view and correction of the temporary development diagram can be corrected easily on the screen.

What is claimed is:

1. An automatic programming apparatus wherein respective planes constituting a solid input from a two-dimensional three-side view drawing are displayed on a screen; when a reference plane and a butting plane are specified within the respective planes, a temporary development diagram is generated in which the butting plane is butted to the reference plane; a solid figure is generated by bending said temporary development diagram based on a bending condition and displayed interlockingly in a region different from a region where said temporary development diagram is displayed; and a development diagram obtained by extracting external frame loop and bending lines of said temporary development diagram is transmitted to CAM on a preceding stage, said automatic programming apparatus comprising:

graphic editing portion for computing for an interference between respective solid planes of said solid figure to notify an interference plane and an interference region of the interference plane as a result of the interference computation;

inverse simulation portion for carrying out inverse simulation with specifying dies in succession from a final bending line of said solid figure to carry out the interference computation to notify a plane interfering with a die as a result of the interference computation;

temporary development diagram correcting portion for reading the results of the interference computations of said graphic editing portion and said inverse simulation portion and correcting said temporary development diagram based on the results of the interference computations; and solid figure generating portion for regenerating a solid figure based on the corrected temporary diagram each time when said temporary development diagram is corrected.

2. The automatic programming apparatus according to claim 1 comprising a plane synthesizing portion for when a side of each of two planes from three planes is specified, regarding one of the two planes as a reference plane and the other plane as a butting plane, butting the specified side of the reference plane with the specified side of the butting plane while possessing an overlapping region corresponding to an elongation value and obtaining said temporary development diagram in which bending lines are entered into said overlapping region;

said solid figure generating portion for bending said temporary development diagram expressed on two-dimensional coordinates by affine transformation on three-dimensional coordinates and generating a surface model by attaching a sheet thickness to a shape obtained by bending said temporary development diagram; and perspective view generating portion for erasing shade planes of the surface model obtained by said solid figure generating portion and displaying specified planes in specified colors.

3. The automatic programming apparatus according to claim 2 wherein attribute information is attached to said temporary development diagram and said surface model.

4. The automatic programming apparatus according to claim 2 further comprising:

elongation value information reading portion for determining whether or not there is bending attribute information coinciding with an input bending condition including an elongation value in attribute information file and if that information exists therein, setting the elongation value in said plane synthesizing portion; and finite element method portion for, when it is determined that said bending attribute information does not exist by said elongation value information reading portion, carrying out bending simulation according to elastoplasticity finite element method based on said bending condition, setting an elongation value obtained by the bending simulation in said plane synthesizing portion and storing the elongation value in said attribute information file.

5. The automatic programming apparatus according to claim 1 further comprising a data transmission/reception portion for carrying out transmission and reception of information with a host machine connected through a line.

6. A computer-readable storage medium for storing a graphic data generation program comprising the steps of:

displaying three faces constituting a solid input according to a two-dimensional three-side view drawing on a screen;

when a reference plane and a butting plane are specified within said three faces, obtaining a temporary development diagram by butting the butting plane with the reference plane while possessing an overlapping region corresponding to an elongation value;

affine-transforming, on three-dimensional coordinates, said temporary development diagram expressed on two-dimensional coordinates;

generating a surface model by attaching a sheet thickness to a shape obtained by said affine transformation;

erasing shade planes on said surface model and indicating specified planes with specified colors;

carrying out interference computation on respective solid planes in said solid figure to notify an interference plane and an interference portion of the interference plane as a result of the interference computation;

carrying out inverse simulation with specifying dies in succession from a final bending line of said solid figure to carry out the interference computation to notify a plane interfering with a die as a result of the interference computation;

reading the results of the interference computations of said graphic editing step and said inverse simulation step and correcting said temporary development diagram based on the results of the interference computations;

regenerating a solid figure based on the corrected temporary diagram each time when said temporary development diagram is corrected; and generating a development diagram by extracting an external frame loop of said corrected temporary development diagram and bending lines.

* * * * *